US006286028B1

(12) United States Patent
Cohen et al.

(10) Patent No.: US 6,286,028 B1
(45) Date of Patent: Sep. 4, 2001

(54) METHOD AND APPARATUS FOR CONDUCTING ELECTRONIC COMMERCE

(75) Inventors: Mitchell Adam Cohen, Yorktown Heights, NY (US); Tracy Mark Harris, Rochester, MN (US); Martin Clarence Sturzenbecker, Carmel, NY (US); James Allen Walters, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/203,280

(22) Filed: Dec. 1, 1998

(51) Int. Cl.[7] ............................. G06F 15/16; G06F 17/30; G06F 17/40
(52) U.S. Cl. ............................. 709/202; 707/101; 705/26
(58) Field of Search ............................. 705/26; 709/202, 709/317; 717/1; 345/335; 707/1, 101

(56) References Cited

U.S. PATENT DOCUMENTS

| | | |
|---|---|---|
| 5,542,078 | 7/1996 | Martel et al. ......................... 707/101 |
| 5,778,349 | 7/1998 | Okonogi ................................... 707/1 |
| 6,055,562 * | 4/2000 | Devarakonda et al. ............. 709/202 |
| 6,065,039 * | 5/2000 | Paciorek ............................... 709/202 |
| 6,106,569 * | 8/2000 | Bohrer et al. ............................. 717/1 |
| 6,119,101 * | 9/2000 | Peckover .................................. 705/26 |

* cited by examiner

Primary Examiner—Thomas Black
Assistant Examiner—Ge Yu Chen
(74) Attorney, Agent, or Firm—Dugan & Dugan

(57) ABSTRACT

A generic interface between an electronic commerce frontend and a business management backend is provided via an object oriented computer program product. In operation, the program creates one or more specific business objects from a plurality of specific business object classes. The program also provides a framework within which the business objects travel. A first framework instance is coupled to the frontend, and a second framework instance is coupled to the backend. In response to a request from the frontend or backend, the framework instance coupled to the requesting end creates a specific business object to perform the requested operation. Specific Business Objects are derived from a common class containing the methods required by the framework, a specific business object class containing the methods for performing a specific business function (e.g., order, provide production information, etc.), a frontend adapter class containing the methods for mapping data from the frontend to the business object, and a backend adapter class containing the methods for mapping data from the business object to a backend.

20 Claims, 11 Drawing Sheets

601

| FRONTEND TABLE | FRONTEND TABLE COLUMN NAME | FRONTEND DATA TYPE |
|---|---|---|
| ORDERS | ORDERNUM | Integer |
| ORDERS | ORDERDATE | Date |
| SHOPPER | SHOPPERFNAME | Char(15) |
| SHOPPER | SHOPPERLNAME | Char(15) |
| SHOPPER | SHOPPERCITY | Char(15) |
| SHOPPER | SHOPPERSTATE | Char(2) |
| ITEMS | ITORDERNUM | Integer |
| ITEMS | ITEMNUM | Integer |
| ITEMS | ITEMPRICE | Num(15.2) |
| ITEMS | ITEMQTY | Integer |

601 → COMMON DATA MODEL

| ORDER BUSINESS OBJECT DATA VARIABLE | ORDER BUSINESS OBJECT DATA TYPE |
|---|---|
| Order_Number | String |
| Order_Date | Date |
| Customer_FirstName | String |
| Customer_LastName | String |
| Order_City | String |
| Order_State | String |
| Order_Number | String |
| Item_Numbers | String Vector |
| Item_Prices | String Vector |
| Item_Quantities | Integer Vector |

| BACKEND TABLE | BACKEND TABLE COLUMN NAME | BACKEND DATA TYPE | Notes |
|---|---|---|---|
| ORDER_HEADER | OHORDERNUM | Char(10) | Type conversion |
| ORDER_HEADER | OHORDERDATE | Date | No data conversion |
| ORDER_HEADER | OHNAME | Char(30) | Combine with last name |
| ORDER_HEADER | OHNAME | Char(30) | Combine with first name |
| ORDER_HEADER | OHCITY | Char(10) | Truncate to 10 chars |
| ORDER_HEADER | OHSTATE | Char(2) | No data Conversion |
| ORDER_LINEITEM | OLORDERNUM | Char(10) | Type conversion |
| ORDER_LINEITEM | OLITENUM | Char(9) | Type conversion |
| ORDER_LINEITEM | OLITEMPRICE | Num(15.2) | No data conversion |
| ORDER_LINEITEM | OLITEMQTY | Integer | No data conversion |

METHOD AND APPARATUS FOR CONDUCTING ELECTRONIC COMMERCE

BACKGROUND OF THE INVENTION

To conduct business on the INTERNET a company must separate its internal business data (e.g., customer profiles, accounts receivable, etc.) from its WEB commerce server. Conventionally, two applications are required, a business management backend application which contains and manages the company's internal business data, and a WEB commerce frontend application with which customers interact via the INTERNET.

The frontend and backend applications are connected via a firewall which prevents INTERNET access to the backend application. However, to enable the frontend and the backend applications to successfully execute the many different commercial operations (e.g., placing an order, obtaining product information, obtaining customer information, obtaining order status, etc.) that arise, requires considerable time and effort. Specifically, each frontend and each backend application typically employs diverse database schemes, program calls, application programming interfaces (APIs) or common-gateway interfaces (CGIs). To compound the problem, the database schemes, program calls, APIs and CGIs of each application may vary with each new release of the application, and companies may frequently change or customize their commercial operations. Accordingly, a generic interface which can be quickly adapted to new frontend and new backend applications is required, as is a method of enabling easily customizable commercial operations.

SUMMARY OF THE INVENTION

The present invention provides an object-oriented computer program product for providing a generic interface between an electronic commerce frontend and a business management backend. The inventive program is carried by a medium readable by a computer (e.g., a carrier wave signal, a floppy disc, a hard drive, a random access memory). The computer readable medium contains object-oriented program code which provides a plurality of object classes from which a specific business object (e.g., an order business object, product information business object, etc.) can be created. The computer readable medium also contains object-oriented program code for mapping data between the frontend and the backend applications, and for transferring data by transferring a specific business object, which is loaded with the data, between the frontend and the backend applications.

Additionally, the computer readable medium contains object-oriented program code for providing a framework within which the specific business objects travel. The framework comprises an environment means for providing data relevant to performing business data manipulations within the framework (e.g., database driver locations, business object class names, and various communications details). A listener object is operatively coupled to the environment means, and to the frontend or the backend application, for receiving an operation ID from the frontend or the backend application. The listener object accesses the environment means to determine a business object class identified by the operation ID, and creates a business object of the identified business object class. The inventive framework further comprises at least one business framework object operatively coupled to both the listener object and the environment means for receiving business objects created by the listener object and for executing a method of each received business object; and a communications object operatively coupled to the at least one business framework object and to the environment means, for sending and receiving business objects to and from both the at least one business framework object and a remote framework.

The code for creating a specific business object provides a common business object class containing methods required by the framework within which the business object is to travel; at least one specific business object class containing data variables and methods specific to the operation to be performed by a business object of the specific business object class; a frontend adapter class containing methods for adapting to a specific frontend application; a backend adapter class containing methods for adapting to a specific backend application; and code for creating a business object derived from the common business object class, the specific business object class, the frontend adapter class and the backend adapter class.

When the source code for the first framework instance is compiled, a base adapter class set is created. The base adapter class set is created by inheriting the common business object class, inheriting the specific business object class, inheriting the frontend adapter class containing the frontend mapping methods and inheriting a backend adapter class containing the backend mapping methods. Thereafter, in operation, the first framework instance receives an operation ID from the frontend application. The operation ID identifies the specific base adapter class from which a business object is to be created (e.g., via a lookup table in the environment means). The data to be transferred by the specific business object class may be provided with the operation ID, or may be loaded into the specific business object in a subsequent step. Thereafter, the specific business object is created from the identified base adapter class, is loaded with data and is transported to a remote framework instance via the communications object. Within the remote framework the data carried by the specific business object is unloaded from the specific business object to the backend application (e.g., by executing an outbound( ) method of the specific business object). The data and methods inherited from the appropriate frontend and backend adapter classes provide the specific business object with the information required to map the data to and from the frontend and the backend, respectively.

Because data mapping information is contained in a separate class (e.g., the "frontend adapter class" and the "backend adapter class") the mapping code can be easily customized for use with one or more frontends and/or one or more backends. An instance of the inventive framework is coupled to each frontend and each backend application. In operation, relevant data is taken from a frontend application or a backend application and placed in a business object readable by each framework instance, making the invention both generic and extensible. The business objects may be customized without requiring revision of the framework. Accordingly, the code for the framework and for the business objects can be packaged separately.

Other objects, features and advantages of the present invention will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

FIG. 6 is a mapping chart for an exemplary Order Business Object showing the mapping of frontend order information from a frontend application to a backend application.

DETAILED DESCRIPTION OF THE PREFERRED EMBODIMENTS

Figure 1:
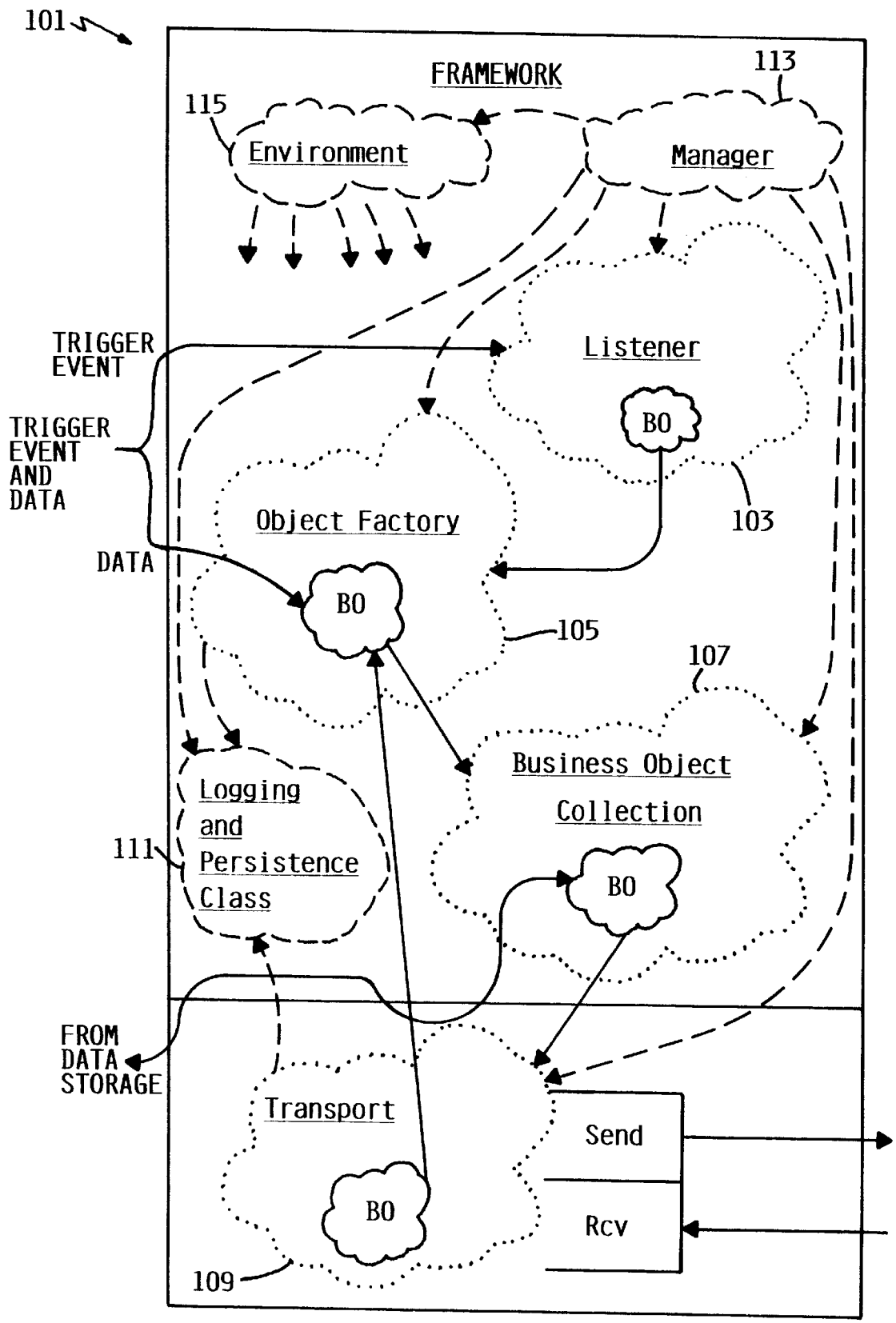
FIG. 1 is schematic diagram of an inventive Framework Instance for providing a generic interface between an electronic commerce frontend and a business management backend.

FIG. 1 is a schematic diagram of an inventive Framework Instance 101 for providing a generic interface between an electronic commerce frontend and a business management backend (as described below with reference to FIGS. 2–6). The Framework Instance 101 comprises, in pertinent part, a Listener Object 103, at least one Business Framework Object (preferably, an Object Factory Object 105 operatively coupled to the Listener Object 103 and a Business Object Collection Object 107 operatively coupled to the Object Factory Object 105, although a single object may be employed to perform the functions of the Object Factory Object 105 and the Business Object Collection Object 107), and a Transport Object 109 operatively coupled to the Object Factory Object 105 and to the Business Object Collection Object 107. The Framework Instance 101 further comprises a Logging and Persistence Object 111 operatively coupled to the Object Factory Object 105 and to the Transport Object 109, a Manager Object 113 operatively coupled to each Object 103–111 and an Environment Object 115 accessible by each Object 103–113.

In general, the Framework Instance 101 operates in both a send and a receive mode. In a send mode the Framework Instance 101 collects relevant data (e.g., from an electronic commerce frontend or a business management backend) in the form of a Business Object (described below) and sends the Business Object to a remote Framework Instance coupled to a remote frontend or backend application. In a receive mode the Framework Instance 101 receives a Business Object from a remote Framework Instance and performs processing on the Business object, transferring the Business Object's relevant data to a frontend or a backend application coupled to the inventive Framework Instance.

More specifically, in the send mode, the Listener Object 103 "listens" for a trigger sent from an external application, and in response to the trigger collects information indicative of the process to be performed by the Framework Instance 101 (i.e., collects an operation ID). The operation ID identifies the type of Business Object (BO) required for execution of the process to be performed (i.e., the current process) and the Listener Object 103 creates a Business Object of the identified type from a pre-existing Base Adapter Class (described below). The Listener Object 103 then passes the Business Object and the location information for the external application (e.g., a handle to a socket on which the trigger occurred) to the Object Factory Object 105.

The Object Factory Object 105 receives the Business Object and the external application location information and executes a first load method (i.e., a load( ) method) of the Business Object. The load method collects a key from the external application that identifies the location of business data relevant to the current process and stores the key within the Business Object. The Object Factory Object 105 then passes the Business Object to the Business Object Collection Object 107.

The Business Object Collection Object 107 receives the Business Object and executes a second load method (i.e., an inbound method) of the Business Object. The inbound( ) method, with use of the key, collects relevant business data from the external application and loads the Business Object therewith. Once loaded with the relevant business data, the Business Object is passed to the Transport Object 109. The Transport Object 109 receives the Business Object and transports it to a remote Framework Instance where the relevant business data is transferred to a remote backend or frontend application.

To avoid inadvertent data loss during processing of the Business Object within both the Framework Instance 101 and the remote Framework Instance, the Logging and Persistence Object 111 performs a backup function. Specifically, the Logging and Persistence Object 111 receives the key from the Object Factory Object 105 and stores the key in a backup file to prevent loss of business data if an error occurs during processing. Alternately, the Logging and Persistence Object 111 may store the Business Object itself. The key, however, is the only information required to recreate a Business Object with the relevant business data stored therein.

The Manager Object 113 executes the startup routine for the Framework Instance 101, including the startup of each Object 103–111. The Manager Object 113 also manages the execution threads for each Business Object, and reads Framework Instance environment information (e.g., database driver locations, Business Object class names, and various communications details) stored within an external file and stores this information within the Environment Object 115. The Environment Object 115 provides the environment information to each Object 101–113 as further described below.

Similarly, when the Framework Instance 101 is in the receive mode, the Transport Object 109 receives a Business Object that has been loaded with business data and transported to the Framework Instance 101 by a remote Framework Instance. Once the Business Object is received by the Transport Object 109, the Transport Object 109 passes the Business Object to the Object Factory Object 105.

The Object Factory Object 105 receives the Business Object, accesses the Environment Object 115 to obtain environment information about the Framework Instance 101 (e.g., the location of files for logging errors and progress of the Business Object within the Framework Instance 101) and loads the Business Object with the relevant environment information. Thereafter, the Object Factory Object 105 passes the Business Object to the Business Object Collection Object 107.

The Business Object Collection Object 107 receives the Business Object and executes a write method (i.e., an outbound( ) method) of the Business Object. The outbound( ) method transfers the business data from the Business Object to an external application (e.g., to an electronic commerce frontend or a business management backend). Following execution of the outbound( ) method, the Business Object is transported back to the remote Framework Instance wherein the Business Object deletes the backup key stored by the remote Framework Instance's Logging and Persistence Object (e.g., for housekeeping purposes).

Figure 2A:
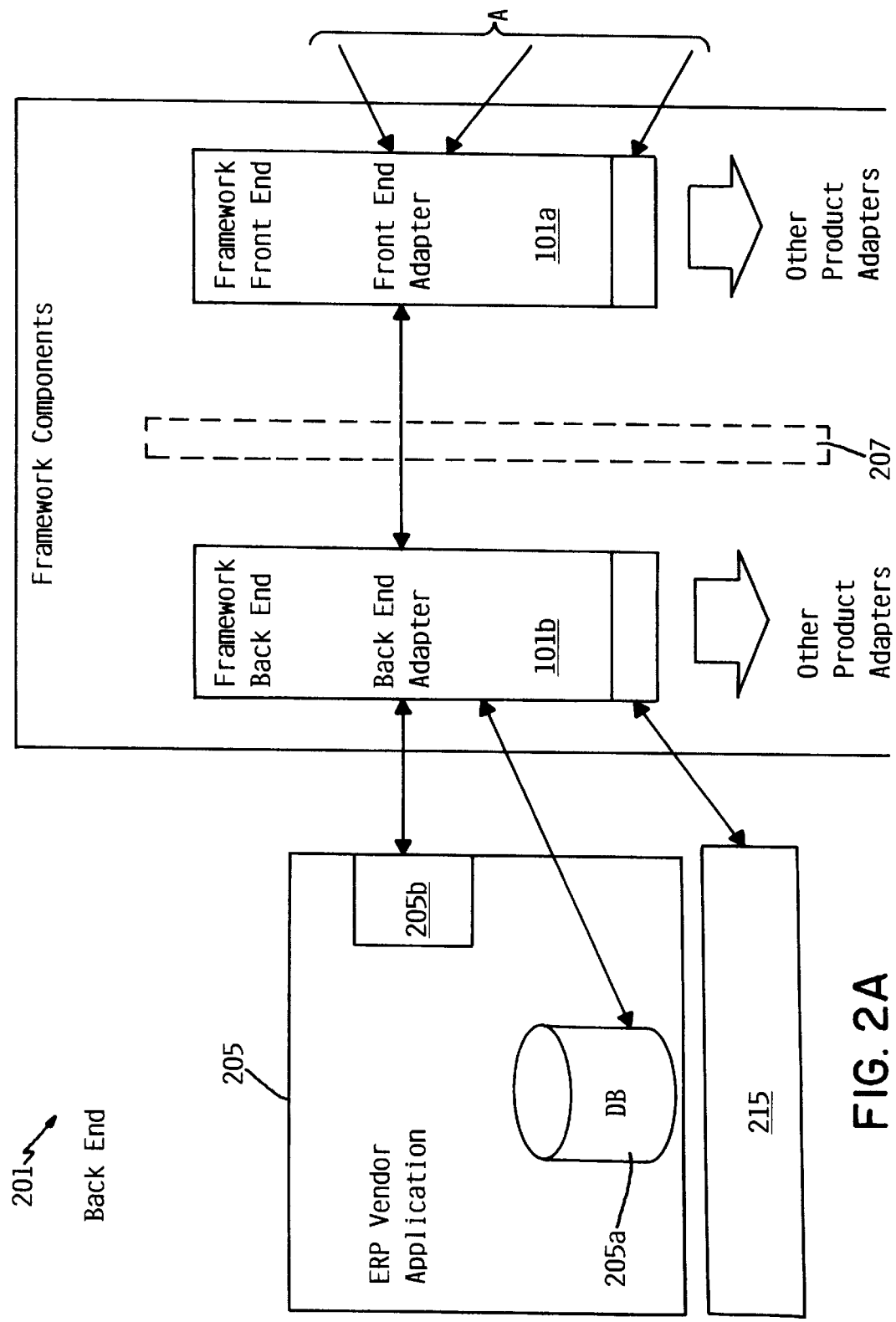
FIG. 2 is a schematic diagram of a processing system in which a plurality of the inventive Framework Instances of FIG. 1 are executing.
Figure 2B:
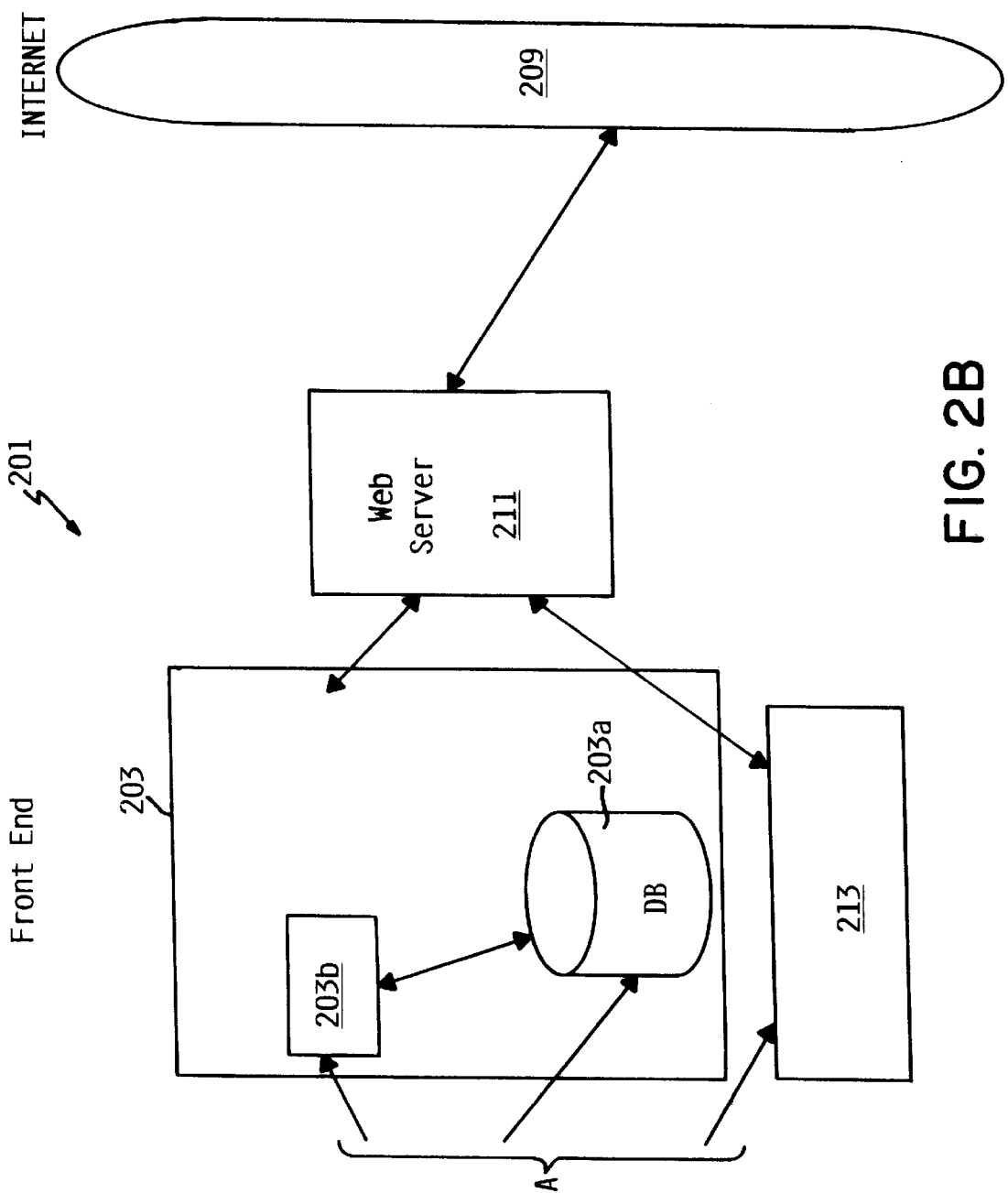

FIG. 2 is a schematic diagram of a processing system 201 in which a plurality of the Framework Instances of the present invention are executing. The processing system 201 comprises a frontend INTERNET commerce application 203 (e.g., IBM's NetCommerce, Domino Merchant, Oracle's Internet Commerce Server, a custom commerce system, etc.), and a backend Electronic Resource Program (ERP) vendor application 205 (e.g, System Software Associates' Business Process Control System, J.D. Edwards' World and One-World Systems, etc.). The frontend INTERNET commerce application 203 and the backend ERP vendor application 205 are connected through a firewall 207 via instances of the inventive Framework. Specifically a first Framework Instance 101*a* is operatively coupled to the frontend INTERNET commerce application 203, and a second Framework Instance 101*b* is operatively coupled to the backend ERP vendor application 205. The first Framework Instance 101*a* and the second Framework Instance 101*b* may be executing on the same computer as the frontend INTERNET commerce application 203 and the backend ERP vendor application 205, respectively, (e.g., an AS/400™, Windows-NT™, AIXT™, OS/390™ etc.) or may be executing on computers which are networked with computers executing the frontend INTERNET commerce application 203 and the backend ERP vendor application 205, respectively. Note that if the frontend INTERNET commerce application 203 and the backend ERP vendor application 205 are executing on the same computer, only one framework instance is required. In such a case, the Transport Object 109 is not needed, and the Business Object completes all its operations within the single framework instance.

The frontend INTERNET commerce application 203 contains a frontend database 203*a* which stores data relating to various commercial functions (e.g., placing an order, obtaining customer information, checking order status, etc.), and a frontend API 203*b* for accessing and extending the frontend function as is conventional. The frontend INTERNET commerce application 203, however, has been modified slightly to include a routine which passes a trigger and an operation ID to the first Framework Instance 101*a* in response to the frontend INTERNET commerce application 203's various frontend commercial functions. Likewise, the backend ERP vendor application 205 contains a backend database 205*a* which stores data relating to (e.g., processing an order, processing customer information, providing order status, etc.), and a backend API 205*b*, as is conventional for accessing and extending the backend function. The backend ERP vendor application 205, however, has been modified slightly to include a routine which passes a trigger and an operation ID to the second Framework Instance 101*b* in response to the backend ERP vendor application 205's various backend commercial functions (e.g., providing order status information, providing product availability information, etc.).

The frontend INTERNET commerce application 203 is further operatively coupled to the INTERNET 209 via a WEB server 211. The processing system 201 also includes additional frontend applications, represented generally by the reference number 213, which are operatively coupled to the INTERNET 209 via the WEB server 211, and which are operatively coupled to the first Framework Instance 101*a*.

Specifically, like the frontend INTERNET commerce application 203, each additional frontend application 213 contains a frontend database and a frontend API (not shown), and each additional frontend application's frontend API has been modified to include an exit routine which passes a predetermined key to the first Framework Instance 101*a*. The processing system 201 also includes additional backend applications, represented generally by the reference number 215. Like the backend ERP vendor application 205, each additional backend application 215 contains a backend database and a backend API (not shown), and each additional backend application's backend API has been modified to include an exit routine which passes a predetermined key to the second Framework Instance 101*b*. The details of the business Objects that operate within the Framework Instances 101*a*, 101*b*, are now described.

A set of Business Object classes is employed to collect, to supply and to transport business data (i.e., to perform business data manipulations) between the frontend INTERNET commerce application 203 and the backend ERP vendor application 205. The Business Object class set contains data variables and methods required to perform business data manipulations using the Framework Instances 101*a*, 101*b* such as:

(1) the specific methods required by each Framework Instance 101*a*, 101*b* to perform business data manipulations therein;

(2) the methods required to interface with the frontend INTERNET commerce application 203 and the backend ERP vendor application 205 or any other frontend or backend applications within the processing system 201 (e.g., the additional frontend applications 213 and the additional backend applications 215); and (3) the methods which control the business data manipulation activities of each Business Object within the Framework Instances 101*a*, 101*b*.

To instantiate a Business Object from the set of Business Object classes, the Listener Object 103 receives a trigger and collects an operation ID which identifies the required Business Object type (e.g, an order Business Object, a customer information Business Object, product information Business Object, a product availability Business Object, an order status Business Object, etc.). When multiple frontend and backend applications are employed, the operation ID also identifies the relevant frontend and backend applications. The Listener Object 103 then creates a Business Object of the identified type. The Business Object of the identified type is created from a pre-existing Base Adapter Class set. The Base Adapter Class set comprises a Base Adapter Class for each possible permutation of (1) a Specific Business Object Class; (2) a Frontend Adapter Class; and (3) a Backend Adapter Class, and is formed as described below with reference to FIG. 3.

Figure 3A:
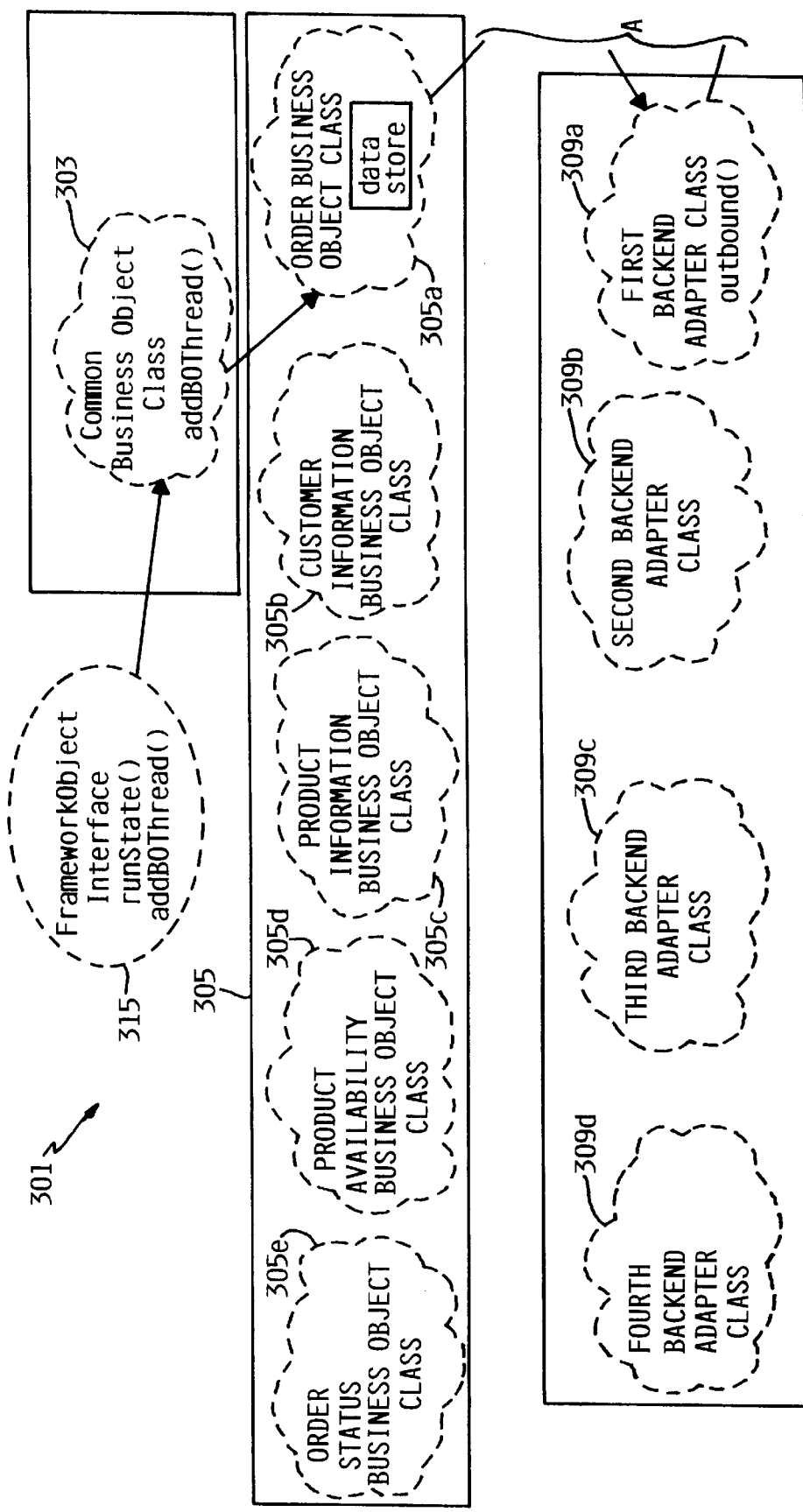
FIG. 3 is a schematic diagram of a Business Object class hierarchy for the Business Object class set of the present invention.
Figure 3B:
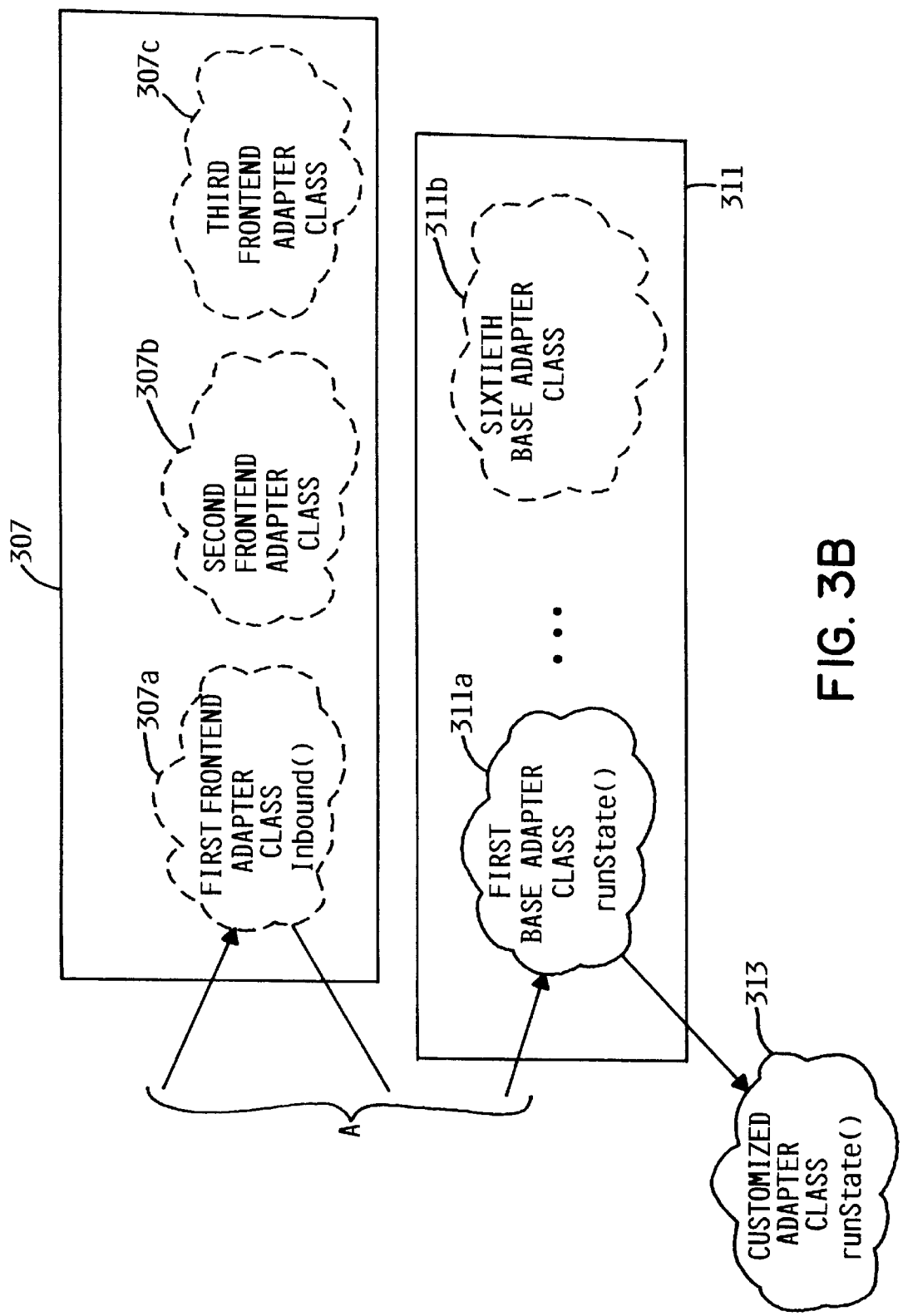

FIG. 3 is a schematic diagram of the hierarchy for an exemplary Business Object class set 301, and is useful in explaining the creation of an inventive Business Object for performing business data manipulations within the Framework Instances 101*a*, 101*b* of FIG. 2. In general, the Business Object class set 301 comprises a Common Business Object Class 303, a Specific Business Object Class set 305 having a plurality of Specific Business Object Classes 305a–e (one for each type of business transaction), a Frontend Adapter Class set 307 having a plurality of Frontend Adapter Classes 307a–c (one for each unique frontend application), a Backend Adapter Class set 309 having a plurality of Backend Adapter Classes 309a–d (one for each unique backend application) and a Base Adapter Class set 311 having a plurality of Base Adapter Classes 311a–n (described below). A customized Adapter Class 313 also may be employed. Abstract classes are shown in phantom.

Through inheritance of the appropriate Business Object classes from the Business Object class set 301, a Base Adapter Class is created having all methods and data variables required to perform the desired business data manipulations within the frontend and backend Framework Instances. The operation ID identifies the appropriate Base Adapter Class and the Listener Object 103 creates a Business Object therefrom. Each Base Adapter Class is created (when the source code for each framework instance is compiled) by traversing the Business Object class set 301's hierarchy as follows:

(1) Methods and data variables common to all Business Objects are provided by the Common Business Object Class 303. Thus, only a single Common Business Object Class is provided.

(2) Based on the particular business data manipulations to be performed (e.g., an order, obtaining customer information, product information, product availability or order status, etc.) by the Business Object, one of the Specific Business Object Classes 305a–e is selected. The selected Specific Business Object Class inherits the Common Business Object Class 303 and provides additional methods and/or data variables specific to the business data manipulations to be performed by the Business Object.

(3) The Frontend Adapter Class appropriate for the frontend application being employed is selected from the Frontend Adapter Class set 307, and the selected Frontend Adapter Class inherits the selected Specific Business Object Class and provides additional methods and/or data variables that allow data to be mapped between the frontend application and the Business Object.

(4) The Backend Adapter Class appropriate for the backend application being employed is selected from the Backend Adapter Class set 309. The selected Backend Adapter Class inherits the selected Frontend Adapter Class and provides additional methods and/or data variables that allow data to be mapped between the backend application and the Business Object.

(5) A Base Adapter Class is then created by inheriting the selected Backend Adapter Class. The created Base Adapter Class thus contains all of the methods and data variables required to map data from the selected frontend application to an inventive Business Object, and to map data from the inventive Business Object to the selected backend application. The Base Adapter Class is a non-abstract class from which actual Business Objects may be created. Because a Base Adapter Class is required for each permutation of a Specific Business Object Class, a Frontend Adapter Class and a Backend Adapter Class, the number of Base Adapter Classes within the Base Adapter Class set 311 equals the number of Specific Business Object Classes times the Frontend Adapter Classes times the number of Backend Adapter Classes (e.g., for the exemplary Business Object Class set 301 of FIG.3, 5 Specific Business Object Classes times 3 Frontend Adapter Classes times 4 Backend Adapter Classes equals 60 Base Adapter Classes). Additional methods and/or data variables may be provided via the Customized Adapter Class 313 if desired.

The specific methods contained within each class of the Business Object class set 301 are described below.

At the highest level of the Business Object class set 301, a Framework Object Interface 315 defines class methods that must be implemented by a Business Object for the Business Object to function properly within each Framework Instance 101a, 101b. Every Business Object therefore contains these methods. In the preferred embodiment, the class methods defined by the Framework Object Interface 315 include the load( ) method, the addBothread( ) method, the destroy( ) method and the runstate( ) method.

The load( ) method is executed by the Object Factory Object 105 to collect a key that identifies the location of business data relevant to a current process. The addBOthread( ) method adds a created Business Object to a thread to allow execution of the Business Object (e.g., via the Object's runstate( ) method). The destroy( ) method releases a thread on which a Business Object is running, allowing the thread to be returned to a Framework Instance's thread pool. The runstate( ) method is a state method that controls travel of a Business Object between the Framework Instances 101a, 101b and the Business object's inbound( ) and outbound( ) methods.

Subordinate to the Framework Object Interface 315 is the Common Business Object Class 303. The Common Business Object Class 303 is the parent class of all Business Object classes and contains the methods and the data variables common to all Business Objects within the Framework Instances 101a, 101b. For instance, the Common Business Object Class 303 implements the addBothread( ) method and the destroy( ) method required by each Framework Instance 101a, 101b, defines a unique identifier variable for each type of Business Object, defines a state variable for controlling the runstate( ) method of each Business Object, and the like. If the Framework Instances 101a, 101b are programmed using JAVA, the Common Business Object Class 303 implements the Serializable Interface (e.g., for use when transporting a Business Object between the first and the second Framework Instances 101a, 101b) and the Cloneable Interface (e.g., to replicate a Business Object when a single Business Object cannot transport all the data). The Common Business Object Class 303 also implements the Framework Object Interface 315.

The Specific Business Object Class set 305 comprises an Order Business Object Class 305a, a Customer Information Business Object Class 305b, a Product Information Business Object Class 305c, a Product Availability Business Object Class 305d and an Order Status Business Object Class 305e. Each Specific Business Object Class 305a–e defines methods and/or data variables specific to performing the Class' particular function. For example, the Order Business Object Class 305a defines methods and data variables specific to obtaining order information from a frontend application and to transferring the order information to a backend application. Similarly, the Customer Information Business Object Class 305b defines functions specific to obtaining customer information from a frontend application and to transferring the customer information to a backend application. In general, nearly every type of business data that must be shared between a frontend and backend application can be communicated via the Specific Business Object Class set 305. As previously described, the Listener Object 103 selects one of the Specific Business Object Classes 305a–e based on the operation ID.

The Specific Business Object Class selected inherits the Common Business Object Class 303 and thus also contains all methods and data variables of the Common Business Object Class 303. The selected Specific Business Object Class also serves as a data store for the particular business data to be processed.

The Frontend Adapter Class set 307 comprises a first Frontend Adapter Class 307a, a second Frontend Adapter Class 307b and a third Frontend Adapter Class 307c. Each Frontend Adapter Class 307a–c defines methods and/or data variables specific to mapping business data between a Business Object and the frontend application associated with the adapter. Each Frontend Adapter Class 307a–c is derived from the selected Specific Business Object Class and thus also contains all methods and data variables of the selected Specific Business Object Class (e.g., the Order Business Object Class 305a in FIG. 3). The selected Frontend Adapter Class provides the required interface to the frontend APIs, commands and databases for the frontend application associated with the selected Frontend Adapter Class. For the Order Business Object Class 305a of FIG. 3, the Frontend Adapter Class 307a provides the required interface for performing the inboundo method that loads business data from the frontend application to the Business Object.

The Backend Adapter Class set 309 comprises a first Backend Adapter Class 309a, a second Backend Adapter Class 309b, a third Backend Adapter Class 309c, and a fourth Backend Adapter Class 309d. Each Backend Adapter Class 309a–d defines methods and/or data variables specific to mapping business data between a Business Object and the backend application associated with the adapter. Each Backend Adapter Class 309a–d is derived from the selected Frontend Adapter Class and thus also contains all methods and data variables of the selected Frontend Adapter Class (e.g., the first Frontend Adapter Class 307a in FIG. 3). The selected Backend Adapter Class provides the required interface to the backend APIs, commands and databases (e.g, providing the interface for the outbound( ) method that transfers business data from a Business Object to the backend application). A significant advantage of the Frontend Adapter Class set 307 and the Backend Adapter Class set 309 is that other frontend or backend applications can be employed merely by providing an additional Frontend Adapter Class or an additional Backend Adapter Class, respectively.

The Base Adapter Class set 311 comprises a first through a sixtieth Base Adapter Class 311a–n. Each Base Adapter Class is derived from a particular Specific Business Object Class, a particular Frontend Adapter Class and a particular Backend Adapter Class and thus contains all methods and/or data variables required for a Business Object to perform its specific business functions and to map data between the particular frontend and backend applications. For example, the Base Adapter Class 311a of FIG. 3 contains all methods and/or data variables required to perform an Order Business Object's functions (provided by the Order Business Object Class 305a) and to map data between the first frontend application and the first backend application (provided by the first Frontend Adapter Class 307a and the first Backend Adapter Class 309a, respectively). Additional methods and/or data variables may be provided by the Base Adapter Class 311, however, the Base Adapter Class 311's main function is to serve as a non-abstract class from which the desired Business Object is created.

The Business Object class hierarchy of FIG. 3 is implemented using a single inheritance object-oriented programming language (e.g, JAVA). Multiple inheritance object-oriented programming languages (e.g., C++) also may be employed to implement the Business Object class set 301 with a different hierarchy structure that achieves the same result.

Figure 4A:
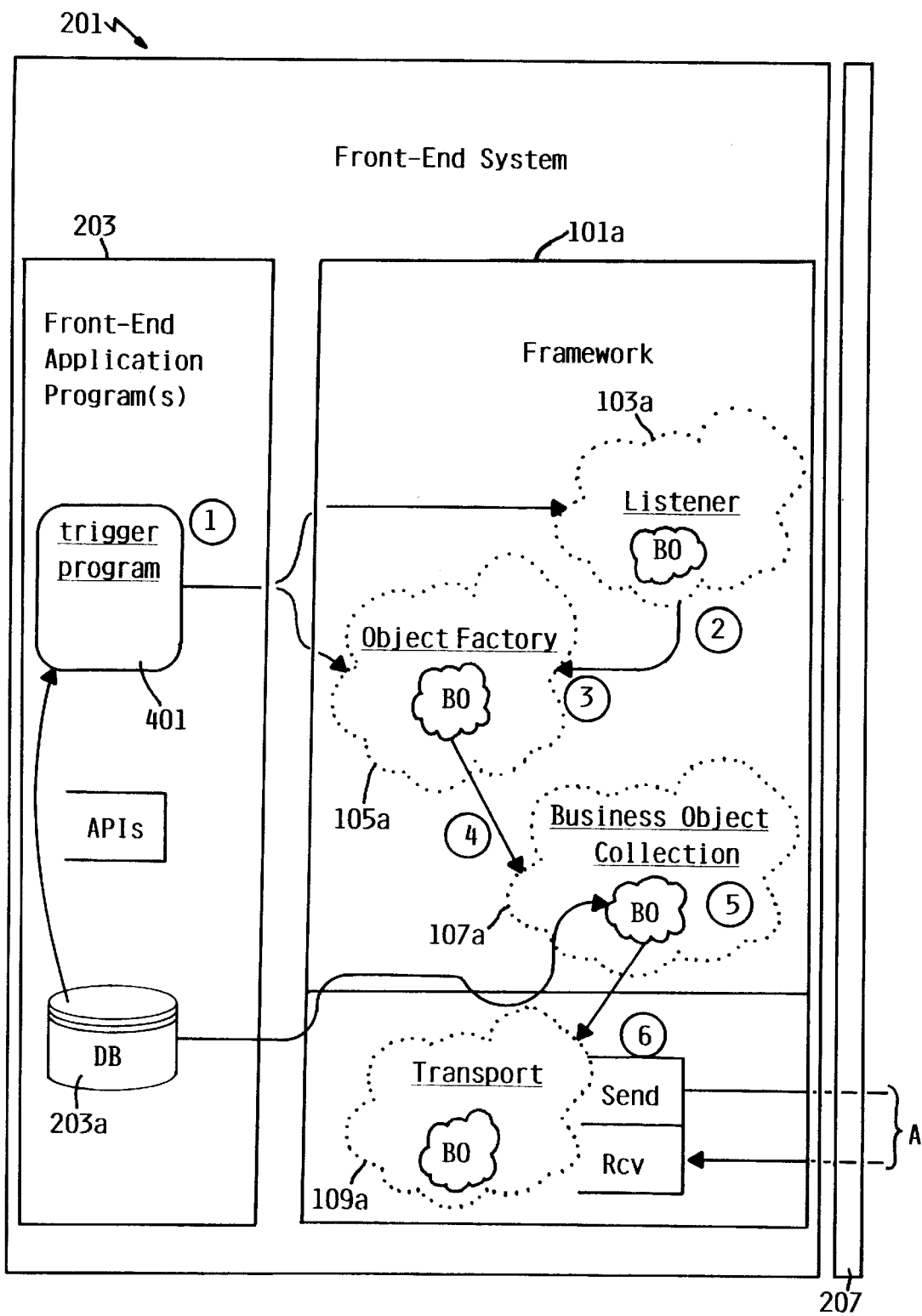
FIG. 4 is a process flow diagram useful in explaining the operation of the processing system of FIG. 2 during the transfer of business data from a backend application to a frontend application.
Figure 4B:
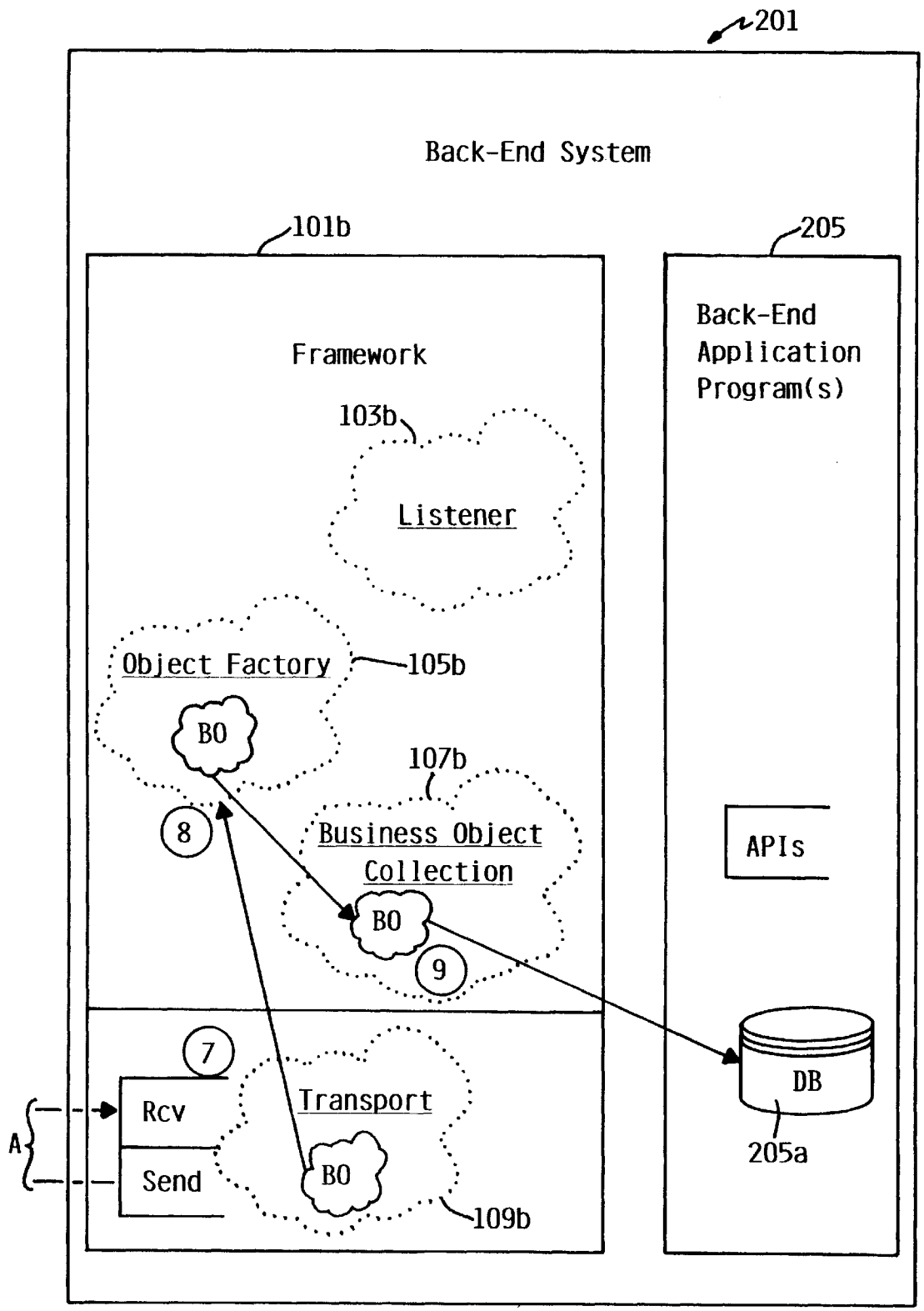
Figure 5:
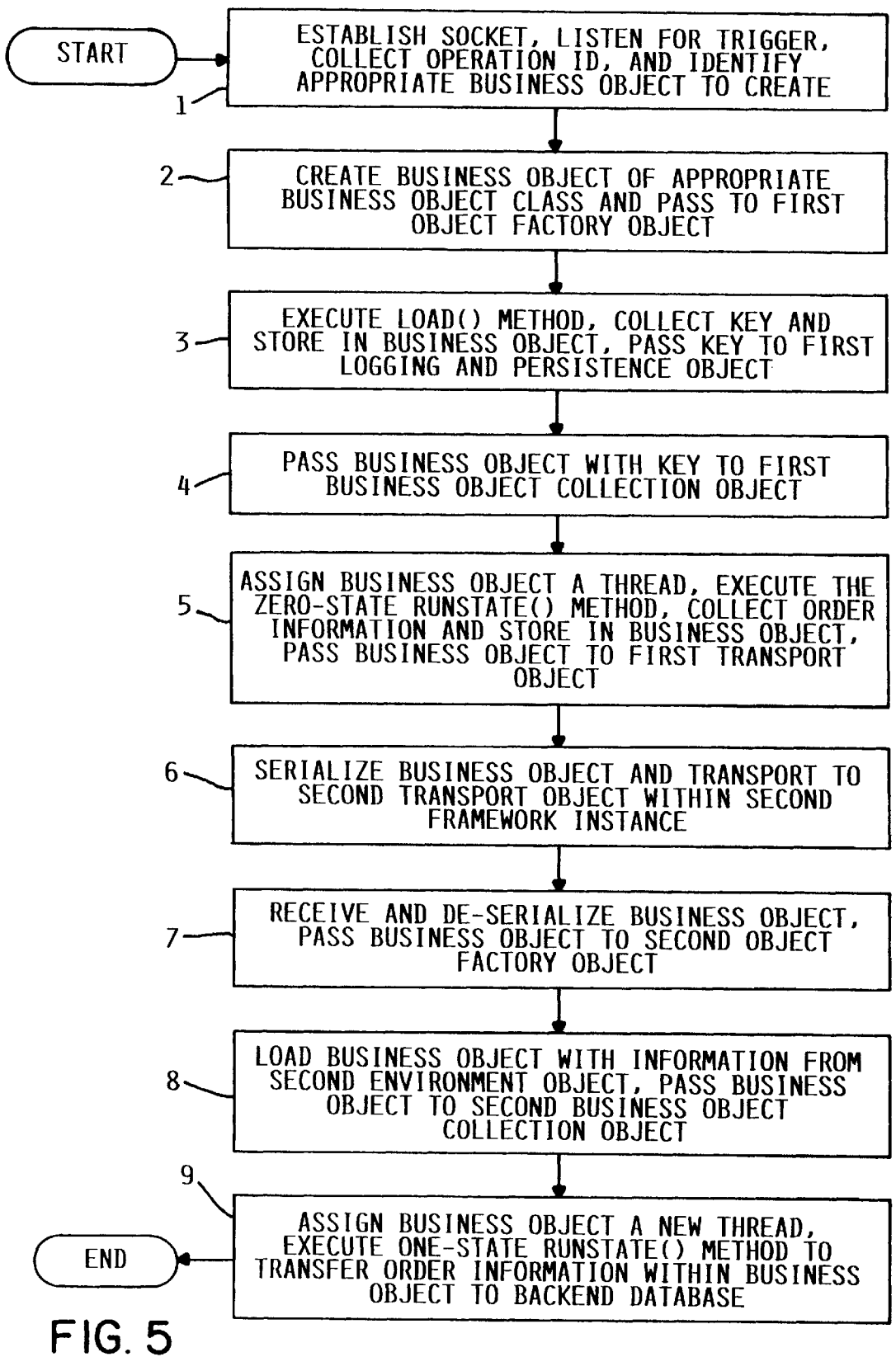
FIG. 5 is a flowchart of the pertinent processing steps that occur during business data transfer within the processing system of FIG. 2.

FIG. 4 is a process flow diagram useful in explaining the operation of the processing system 201 of FIG. 2 during the transfer of business data from the backend ERP vendor application 205 to the frontend INTERNET commerce application 203. FIG. 5 is a flowchart of the pertinent processing steps that occur during business data transfer within the processing system 201.

With reference to FIG. 4, the first Framework Instance 101a comprises a first Listener Object 103a, a first Object Factory Object 105a, a first Business Object Collection Object 107a and a first Transport Object 109a interconnected as previously described with reference to FIG. 1. The first Framework Instance 101a also comprises a first Logging and Persistence Object 111a, a first Manager Object 113a and a first Environment Object 115a (not shown). The second Framework Instance 101b comprises a second Listener Object 103b, a second Object Factory Object 105b, a second Business Object Collection Object 107b and a second Transport Object 109b interconnected as previously described with reference to FIG. 1, and a second Logging and Persistence Object 111b, a second Manager Object 113b and a second Environment Object 115b (not shown).

The frontend INTERNET commerce application 203 includes a trigger program 401 operatively coupled to the first Listener Object 103a, to the first Object Factory Object 105a and to the frontend database 203a. The trigger program 401 supplies the first Listener Object 103a with a trigger and an operation ID to initiate processing within the first Framework Instance 101a (as previously described). The trigger program 401 also supplies the key that identifies the location of the relevant business data within the frontend database 203a. Note that the backend ERP vendor application 205 also may include a trigger program that operatively couples to the second Listener Object 103b, to the second Object Factory Object 105b and to the backend database 205b to allow transfer of business data from the backend ERP vendor application 205 to the frontend INTERNET commerce application 203.

The trigger program 401 may comprise program code which is added to the frontend INTERNET commerce application 203 or merely a function conventionally performed by the frontend INTERNET commerce application 203 which is used to trigger the Listener Object 103a (e.g., performing a database read, adding a message to a message queue, connecting to a socket). Similarly, an Object Request Broker environment with a remote procedure call or any other inter-process call may constitute the trigger program 401.

To place an order, a customer accesses the frontend INTERNET commerce application 203 via the INTERNET 209. Specifically, the customer employs a WEB browser to access the WEB server 211, which in turn interfaces the frontend INTERNET commerce application 203. The customer may wish to browse a catalog, place an order or query the status of a previous order via the WEB server 211.

When a customer places an order, various order information must be shared between the backend and the frontend application (e.g., the order number, customer information, the item ordered, etc.). In general, order information is collected from the customer by the WEB server 211, is transferred to the frontend INTERNET commerce application 203, is stored in the frontend database 203a and then is transferred from the frontend INTERNET commerce application 203 to the backend ERP vendor application 205 via the Framework Instances 101a, 101b and an appropriate Business Object. Mapping of the order information also must be performed as the order information is transferred between the frontend INTERNET commerce application 203 and the backend ERP vendor application 205. As described below, order information mapping occurs during the inboundo and outbound( ) methods.

TABLES 1–3 below represent exemplary customer information necessary for a customer order to be processed by the frontend INTERNET commerce application 203. TABLES 1–3 therefore exist within the frontend database 203a of the frontend INTERNET commerce application 203. TABLE 1 comprises the order number (ORDERNUM), the shopper number (ORSHOPPERNUM) that identifies the customer placing the order, the date the order was placed (ORDERDATE) and the status of the order (ORDERSTATUS). The exemplary data in TABLE 1 shows that the order has been assigned order number 11234 by the frontend INTERNET commerce application 203, the customer has been assigned shopper number 1005 by the frontend INTERNET commerce application 203, the order was placed on Oct. 12, 1492 (14921012) and the order status is pending (P).

TABLE 1

ORDERS table:

| Column name | Sample Data |
| --- | --- |
| ORDERNUM | 11234 |
| ORSHOPPERNUM | 1005 |
| ORDERDATE | 14921012 |
| ORDERSTATUS | P |

TABLE 2 comprises the shopper number (SHOPPERNUM), the customer's first name (SHOPPERFNAME), the customer's last name (SHOPPERLNAME), the customer's city (SHOPPERCITY) and the customer's state (SHOPPERSTATE). The data in TABLE 2 shows that the customer has been assigned shopper number 1005 by the frontend INTERNET commerce application 203, the customer's name is Chris Columbus, the customer's city is Plymouth Rock and the customer's state is Massachusetts.

TABLE 2

SHOPPER table:

| Column name | Sample Data |
| --- | --- |
| SHOPPERNUM | 1005 |
| SHOPPERFNAME | Chris |
| SHOPPERLNAME | Columbus |
| SHOPPERCITY | Plymouth Rock |
| SHOPPERSTATE | MA |

TABLE 3 comprises the number of the item ordered by the customer (ITEMNUMBER), the order number (ITORDERNUM), a description of the item ordered (ITEMDESC), the price of the item ordered (ITEMPRICE) and the quantity of the item ordered (ITEMQTY). The data in TABLE 3 shows that item number 99876 was ordered, the order was assigned order number 11234, the item ordered was a compass at a price of $9.95 and one compass was ordered.

TABLE 3

ITEMS table:

| Column name | Sample Data |
| --- | --- |
| ITEMNUM | 99876 |
| ITORDERNUM | 11234 |
| ITEMDESC | Compass |
| ITEMPRICE | 9.95 |
| ITEMQTY | 1 |

With reference to FIGS. 4 and 5, in step (1), the trigger program 401 sends a trigger to the first Listener Object 103a indicating that order information is present within the frontend database 203a that must be transferred to the backend database 205a for processing within the backend ERP vendor application 205. The trigger is preferably accomplished by having the trigger program 401 connect to a TCP/IP port provided by the first Listener Object 103a, and by having the first Listener Object 103a listen for socket connections to the port. The address of the TCP/IP port may be stored in the first Environment Object 115a.

In response to the trigger from the trigger program 401, the first Listener Object 103a collects from the trigger program 401 an operation ID that identifies the type of Business Object that must be created to carry the order information. By examining the contents of the first Environment Object 115a, wherein a Base Adapter Class for each Specific Business Object Class, Frontend Adapter Class and Backend Adapter Class permutation is assigned an operation ID, the first Listener Object 103a determines the appropriate Business Object to create as indicated by the received operation ID. Thereafter, in step (2), the first Listener Object 103a creates (via the appropriate Base Adapter Class of FIG. 3) a Business Object of the appropriate Specific Business Object Class, in this example an Order Business Object, and passes the Order Business Object and a trigger program 401 pointer (e.g., a handle to the TCP/IP socket) to the first Object Factory Object 105a.

As previously described with reference to FIG. 3, when a Business Object is created, the Business Object is provided with a runstate( ) method for controlling travel of a Business Object between Framework Instances. Initially, the runstate( ) is in a "zero-state" and the Business Object (in this example an Order Business Object) executes only zero-state methods (e.g., the inboundo method to collect business data from the frontend INTERNET commerce application 203). After the Order Business Object is transported to the second Framework Instance 101b, the one-state methods are executed (e.g., the outbound( ) method for storing business data in the backend ERP vendor application 205).

In step (3) the first Object Factory Object 105a receives the Order Business Object, receives the trigger program 401 pointer, and executes the load method of the Order Business Object. The load method uses the trigger program 401 pointer to collect a key that identifies the location within the frontend database 203a of the order information (e.g., TABLES 1–3) to be transferred to the backend ERP vendor application 205. In the example order of TABLES 1–3, the order number (ORDERNUM) 11234 is the key passed to the first Object Factory Object 105a and stored in a data variable "OrderNumber" of the Order Business Object. With knowledge of the order number, the Order Business Object has a pointer to each TABLE 1–3 (e.g., via ORDERNUM in TABLE 1, via SHOPPERNUM in TABLE 2 and via ITEMORDERNUM in TABLE 3).

In step (4) the first Object Factory Object 105a passes the Order Business Object (containing the key) to the first Business Object Collection Object 107a. Also, the key is passed to the first Logging and Persistence Object 111a for backup purposes (as previously described).

In step (5) the first Business Object Collection Object 107a receives the Order Business Object and assigns the Order Business Object a thread for execution of its zero-state runstate( ) method. The zero-state runstate( ) method executes the inboundo method that uses the key (e.g., the order number) to collect the order information from the frontend database 203a. Information such as the name of the frontend database 203a, the driver used to connect to the frontend database 203a, the connection parameters and the any required password are suppled to the first Business Object Collection Object 107a via the first Environment Object 115a. The first Business Object Collection Object 107a stores the order information within a data store of the Order Business Object. Thereafter, the Order Business Object is passed to the first Transport Object 109a.

In step (6) the first Transport Object 109a receives the Order Business Object and transports it to the second Transport Object 109b of the second Framework Instance 101b. The transport of the Order Business Object between the first Transport Object 109a and the second Transport Object 109b may be achieved in many ways and with many different communications protocols. For instance, TCP/IP sockets, message queuing middleware or any other method for sending a string of data may be used. Preferably the first Transport Object 109a establishes a socket connection to the second Transport Object 109b. The first Transport Object 109a then serializes the order Business Object and sends it over the open socket connection to the second Transport Object 109b. Before sending the Order Business Object, the state variable accessed by the runstate( ) method of the Object is incremented to the one-state.

In step (7) the second Transport Object 109b receives the Order Business Object from the first Transport Object 109a and de-serializes the Order Business Object. The Order Business Object then is passed to the second Object Factory Object 105b where, in step (8), the Order Business Object is loaded with information specific to the second Framework Instance 101b (e.g., the location of files for logging errors and progress of the Order Business Object within the second Framework Instance 101b) from the second Environment Object 115b. The Order Business Object then is passed to the second Business Object Collection Object 107b.

In step (9), the second Business Object Collection Object 107b provides the Order Business Object with a new thread for execution of the Order Business Object's runstate( ) method (which is now the one-state). Executing the one-state runstate( ) method executes the outbound( ) method. The outbound( ) method transfers the order information from the Order Business Object to the backend database 205a. Information about the backend database 205a (e.g., the database's name, the driver used to connect to the backend database 205a, the database's connection parameters and any required password) are provided to the Order Business Object via the second Environment Object 115b.

TABLES 4 and 5 show how the order information obtained from the frontend database 203a is organized within the exemplary backend database 205a. TABLE 4 comprises a backend order number (OHORDERNUM), the date the order was placed (OHORDERDATE), the name of the customer who placed the order (OHNAME), the customer's city (OHCITY) and the customer's state (OHSTATE). The data in TABLE 4 contains new data (e.g., the backend order number), data common to frontend TABLES 1 and 2 (e.g, the order date and customer information), and concatenated information (e.g., OHNAME which comprises the first and the last name of the customer). TABLE 5 comprises the item number ordered by the customer (OLITEMNUMBER), the backend order number (OLORDERNUM), the price of the item ordered (OLITEMPRICE) and the quantity ordered (OLITEMQTY).

TABLE 4

ORDER_HEADER table:

| Column name | Sample Data |
| --- | --- |
| OHORDERNUM | 908070 |
| OHORDERDATE | 14921012 |
| OHNAME | Chris Columbus |
| OHCITY | Plymouth R |
| OHSTATE | MA |

TABLE 5

ORDER_LINEITEM table:

| Column name | Sample Data | Sample Data |
| --- | --- | --- |
| OLITEMNDM | 99876 | 99543 |
| OLORDERNUM | 908070 | 908070 |
| OLITEMPRICE | 9.95 | 2.89 |
| OLITEMQTY | 1 | 3 |

As can be seen with reference to TABLES 1–5, there is no direct relationship between the manner in which the order information is stored within the frontend database 203a (the particular columns and rows, the data types, etc.) and the manner in which the order information is stored within the backend database 205a. To ensure that the proper frontend data is properly placed within the backend database 205a, mapping occurs as the order information is read into the Order Business Object (during the inboundo method within the first Business Object Collection Object 107a) and as the order information is transferred to the backend database 205a from the Order Business Object (during the outbound( ) method within the second Business Object Collection Object 107b).

Mapping business data between a frontend application and a backend application is performed by:

(1) defining the information required by the backend application (e.g., the required order information);

(2) defining the information available from the frontend application; and (3) building a common data model for a Business Object that can be loaded with the available frontend information and used to populate the backend application.

For instance, the order information required by the backend ERP vendor application 205 during an order is listed in TABLES 4 and 5, and the order information available from the frontend INTERNET commerce application 203 is listed in TABLES 1–3. While all order information required by the backend ERP vendor application 205 is present in TABLES 1–3 (stored within the frontend database 203a), the order information in TABLES 1–3 is organized differently than the order information within the backend ERP vendor application 205 (organized as shown in TABLES 4 and 5). Accordingly, data mapping is required.

FIG. 6 is a mapping chart 601 for the Order Business Object showing the frontend order information stored within the frontend INTERNET commerce application 203 being mapped into the format required by the backend ERP vendor application 205. The mapping chart 601 comprises a first column 603 that identifies the frontend table wherein the frontend order information is stored, a second column 605 that identifies the specific column of the frontend table wherein the frontend order information is stored, and third column 607 that identifies the data type (e.g., integer, character, etc.) for the order information stored in the specific column. Thus, columns 603–607 represent how order information is arranged within the frontend INTERNET commerce application 203.

The mapping chart 601 further comprises a fourth column 609 that identifies the Order Business Object data variable wherein the frontend order information is to be stored and a fifth column 611 that identifies the data type to which the frontend order information must be converted for storage within the Order Business Object data variable. Thus, columns 609–611 represent the common data model for storage of data within the Order Business Object.

The mapping chart 601 further comprises a sixth column 613 that identifies the backend table wherein the frontend order information is to be stored, a seventh column 615 that identifies the specific column of the backend table wherein the frontend order information is to be stored, and an eighth column 617 that identifies the data type to which the frontend order information must be converted for storage within the specific backend column. A ninth column 619 is provided merely to indicate any alterations (type conversions, truncations, etc.) that must be made to the frontend order information before it is stored within the backend database 205a.

The Order Business Object that transfers order information from the frontend INTERNET commerce application 203 to the backend ERP vendor application 205 is created based on the Order Business Object's common data model. That is, the inboundo method of the Order Business Object performs the mapping and alterations of the frontend order information required for storage of the frontend order information within the Order Business Object in the common data model format as the order information is loaded from the frontend database 203a into the Order Business Object. Likewise, the outbound( ) method performs the mapping and alterations of the order information stored within the Order Business Object required for storage of the order information within the backend ERP vendor application 205 as the order information is loaded from the Order Business Object into the backend database 205a. In this manner, a new frontend application can be interfaced with the first Framework Instance 101a merely by providing a frontend adapter class for the new frontend application that maps frontend information from its frontend format to the common data model format; and the existing backend adapter classes need not be modified. New backend applications for the second Framework Instance 101b may be similarly provided.

The foregoing description discloses only the preferred embodiments of the invention, modifications of the above disclosed apparatus and method which fall within the scope of the invention will be readily apparent to those of ordinary skill in the art. For instance, a Business Object may be created within the Object Factory object 105 rather than within the Listener Object 103, and the business data itself rather than the key may be sent to a Business Object from the trigger program. As well, composition/containment methods may be used to create a Base Business Object which contains an instance of a specific frontend adapter class, an instance of a specific backend adapter class, an instance of a data object class and an instance of a state object class (for controlling the operation of the Business Object). An instance of a data object class and an instance of a state object class can be included in the Base Business Object Class.

In addition, mapping of frontend application business data between a frontend application and a Business Object, and between a Business Object and a backend application may be performed automatically (e.g., without hard coding the inbound( ) and outbound( ) methods of the Business Object for the particular frontend and backend applications being employed) by automatically creating a mapping chart 601 for the frontend and the backend applications of interest. The frontend application provides columns 603–607 of the mapping chart 601, the backend application provides columns 615–619 of the mapping chart 601, and the Business Object consults the mapping chart 601 to find the necessary pointers (e.g., columns 603–605) and data conversions (e.g., column 607) for mapping data from the frontend application to the Business Object (e.g., into the data variables and format of columns 609–611), and to find the necessary pointers (e.g., columns 613–615) and data conversions (e.g., column 617) for mapping data from the Business Object to the backend application.

Accordingly, while the present invention has been disclosed in connection with the preferred embodiments thereof, it should be understood that other embodiments may fall within the spirit and scope of the invention, as defined by the following claims.

The invention claimed is:

1. An object-oriented computer program product for providing a generic interface between an electronic commerce frontend and a business management backend, comprising:
   a medium readable by a computer, the computer readable medium having:
      means for providing a plurality of business object classes, each business object class for providing a business object having:
         means for mapping data between the frontend and the backend; and
         means for transferring data between the frontend and the backend by transferring the business object therebetween.

2. The computer program product of claim 1 wherein the mapping means comprises a frontend adapter class for inheritance by each business object class and a backend adapter class for inheritance by each business object class.

3. The computer program product of claim 1 wherein the transfer means comprises a state mechanism.

4. The computer program product of claim 1 wherein the plurality of business object classes comprises at least one each of an order business object class, a customer information business object class, a product information business object class, a product availability business object class, and an order status business object class.

5. An object-oriented computer program product for providing a generic interface between an electronic commerce frontend and a business management backend, comprising:
   a medium readable by a computer, the computer readable medium having:
      a framework having:
         an environment means for providing data relevant to performing business data manipulations within the framework;
         a listener object coupled to the environment means, for coupling to the frontend or the backend, for receiving an operation ID from the frontend or the backend, for accessing the environment means to determine a business object class identified by the operation ID, and for creating a business object of the identified business object class;

at least one business framework object operatively coupled to both the listener object and the environment means for receiving business objects created by the listener object and for executing methods of each received business object; and a communications object operatively coupled to the at least one business framework object and to the environment means, for sending and receiving business objects to and from both the at least one business framework object and a remote framework.

6. The computer program product of claim 5 wherein the at least one business framework object is for executing both an inbound and an outbound method of the created business object.

7. The computer program product of claim 6 wherein the at least one business framework object comprises:

a first framework object coupled to the listener object for receiving from the listener object:
a) the created business object; and
b) a handle to the frontend or the backend that transmitted the operation ID;

and for executing a load method of the created business object to load, from the transmitting frontend or backend, a key which identifies the location of business data to be transported by the created business object.

8. The computer program product of claim 7 wherein the at least one business framework object further comprises:

a second framework object coupled to the first framework object and to the communications object for executing the business object's inbound method, and wherein the business object's inbound method uses the key to import data required by the created business object from the frontend or the backend location identified by the key.

9. The computer program product of claim 7 wherein the at least one business framework object further comprises:

a second framework object coupled to the first framework object and to the communications object for executing the business object's outbound method.

10. The computer program product of claim 6 wherein the communications object is for serializing business objects to be sent to a remote framework, and for deserializing business objects received from a remote framework.

11. An object-oriented computer program product for forming a business object to be used within a generic framework interface between an electronic commerce frontend and a business management backend, comprising:

a medium readable by a computer, the computer readable medium having:

a common business object class containing methods required by the framework within which the business object is to travel;

at least one specific business object class containing data variables and methods specific to the operation to be performed by a business object of the specific business object class;

a frontend adapter class containing methods for adapting to a specific frontend;

a backend adapter class containing methods for adapting to a specific backend; and means for creating a business object derived from the common business object class, the specific business object class, the frontend adapter class and the backend adapter class.

12. The computer program product of claim 11 wherein the common business object class comprises a state mechanism and a method for adding business object threads.

13. The computer program product of claim 11 wherein the at least one specific business object class comprises a state mechanism for executing the operation to be performed by a business object of the specific business object class.

14. The computer program product of claim 13 wherein the state mechanism accesses an environment means which contains data relevant to performing the operation of a business object of the specific business object class.

15. A computer based method for creating by inheritance a generic business object to interface between an electronic commerce frontend and a business management backend, comprising:

inheriting a common business object class containing methods required by a framework within which business objects are to travel;

inheriting a plurality of specific business object classes, each specific business object class having data variables and methods specific to an operation to be performed by business objects of the specific business object class;

inheriting a frontend adapter class for mapping data from the frontend or the backend to a business object; and inheriting a backend adapter class for mapping data from a business object to the frontend or the backend.

16. The computer based method of claim 15 further comprising creating a plurality of base adapter classes by inheriting each possible permutation of specific business object classes, frontend adapter classes and backend adapter classes.

17. A computer based method for providing a generic interface between an electronic commerce frontend and a business management backend, comprising:

receiving an operation ID from the frontend or the backend;

determining a business object class identified by the operation ID;

creating a business object of the identified business object class by:

inheriting a common business object class containing methods required by a framework within which the created business objects is to travel;

inheriting a specific business object class having data variables and methods specific to an operation to be performed by the created business object;

inheriting an inbound adapter class for mapping data from the frontend or the backend to the created business object; and inheriting an outbound adapter class for mapping data from the created business object to the frontend or the backend; and transporting the created business object to a remote framework instance.

18. The computer based method of claim 17 further comprising:

receiving from the frontend or the backend which transmitted the operation ID, a key identifying the location of data required by the created object's data variables; and loading the data into the created business object.

19. The computer program product of claim 1 further comprising:

means for providing a framework having:

an environment means for providing data relevant to performing business data manipulations within the framework;

a listener object coupled to the environment means, for coupling to the frontend or the backend, for receiving an operation ID from the frontend or the backend, for accessing the environment means to determine a business object class identified by the operation ID, and for creating a business object of the identified business object class;

at least one business framework object operatively coupled to both the listener object and the environment means for receiving business objects created by the listener object and for executing methods of each received business object; and a communications object operatively coupled to the at least one business framework object and to the environment means, for sending and receiving business objects to and from both the at least one business framework object and a remote framework.

20. The computer program product of claim 5 further comprising:

a common business object class containing methods required by the framework within which the business object is to travel;

at least one specific business object class containing data variables and methods specific to the operation to be performed by a business object of the specific business object class;

a frontend adapter class containing methods for adapting to a specific frontend;

a backend adapter class containing methods for adapting to a specific backend; and means for creating a business object derived from the common business object class, the specific business object class, the frontend adapter class and the backend adapter class.

\* \* \* \* \*